United States Patent
Azadet et al.

(10) Patent No.: US 7,089,485 B2
(45) Date of Patent: Aug. 8, 2006

(54) SIMPLE LINK PROTOCOL PROVIDING LOW OVERHEAD CODING FOR LAN SERIAL AND WDM SOLUTIONS

(75) Inventors: Kamran Azadet, Morganville, NJ (US); Leilei Song, Eatontown, NJ (US); Thomas E. Truman, Red Bank, NJ (US); Meng-Lin Yu, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 883 days.

(21) Appl. No.: 09/776,175

(22) Filed: Feb. 2, 2001

(65) Prior Publication Data

US 2001/0034729 A1    Oct. 25, 2001

Related U.S. Application Data

(60) Provisional application No. 60/180,079, filed on Feb. 3, 2000.

(51) Int. Cl.
*G06F 11/00*    (2006.01)

(52) U.S. Cl. .................. 714/798; 714/799; 714/775; 714/789; 370/503; 375/357

(58) Field of Classification Search ............... 714/781, 714/775, 798, 799, 789; 370/509–514, 503; 375/357
See application file for complete search history.

(56) References Cited

U.S. PATENT DOCUMENTS

| | | | | |
|---|---|---|---|---|
| 5,260,933 A * | 11/1993 | Rouse | ......................... | 370/216 |
| 5,321,754 A * | 6/1994 | Fisher et al. | ................ | 380/268 |
| 5,331,318 A * | 7/1994 | Montgomery | ............ | 340/855.4 |
| 5,497,404 A * | 3/1996 | Grover et al. | ......... | 375/240.27 |
| 5,559,796 A * | 9/1996 | Edem et al. | ................ | 370/412 |
| 5,905,756 A * | 5/1999 | Lamkin et al. | ............. | 375/222 |
| 6,363,514 B1 * | 3/2002 | Kawai et al. | ............... | 714/798 |
| 6,449,288 B1 * | 9/2002 | Chari et al. | ................ | 370/470 |
| 6,546,025 B1 * | 4/2003 | Dupuy | ....................... | 370/509 |
| 6,570,890 B1 * | 5/2003 | Keenan et al. | .............. | 370/493 |
| 6,636,496 B1 * | 10/2003 | Cho et al. | .................... | 370/335 |
| 6,665,285 B1 * | 12/2003 | Treadaway et al. | ......... | 370/338 |
| 6,873,630 B1 * | 3/2005 | Muller et al. | ............... | 370/542 |

OTHER PUBLICATIONS

A Simple Data Link Protocol for High-Speed Packet Networks, Doshi et al., Bell Labs Technical Journal, Jan.-Mar. 1999, pp. 85-104.

* cited by examiner

*Primary Examiner*—Guy Lamarre
*Assistant Examiner*—Esaw Abraham

(57) ABSTRACT

A data structure, method and protocol wherein synchronization data indicative of a data frame delineation point is inserted within an inter-packet gap (IPG) proximate a data frame during transmission. Optionally, a cyclical redundancy check (CRC) length indicative data, pointer data, and other data is inserted within the IPG to further insure appropriate delineation of data frames within a data stream.

29 Claims, 8 Drawing Sheets

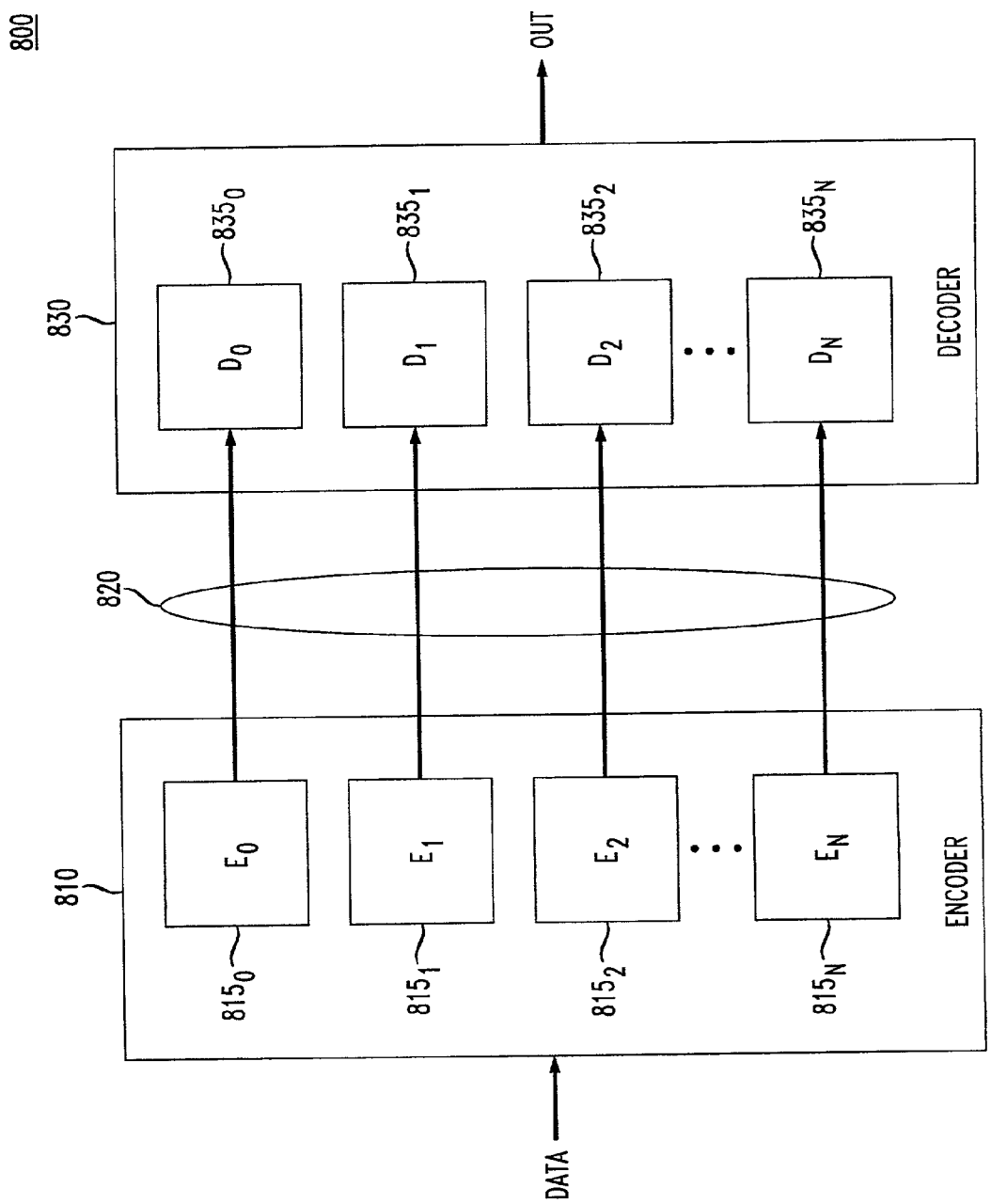

SIMPLE LINK PROTOCOL PROVIDING LOW OVERHEAD CODING FOR LAN SERIAL AND WDM SOLUTIONS

CROSS-REFERENCE TO RELATED APPLICATION

This application claims the benefit of provisional application Ser. No. 60/180,079, filed on Feb. 3, 2000, entitled ZERO OVERHEAD CODING FOR LAN SERIAL AND WDM SOLUTIONS, which provisional application is incorporated herein by reference in its entirety.

TECHNICAL FIELD

The invention relates to the field of communications systems and, more specifically, to a data structure, method and protocol enabling zero-overhead coding of data.

BACKGROUND OF THE INVENTION

The ever-increasing need for greater bandwidth in core, enterprise, and local-area networks has driven the popular Institute for Electrical and Electronic Engineers (IEEE) 802.3 Ethernet standard to continuously push the transmission speeds for simple, low-cost, point-to-point networking. As transmission rates increase, the design of the Physical Layer protocols dramatically impacts the cost and complexity of both component and system implementation.

Beginning with the Fast Ethernet standard (IEEE 802.3u), the physical layer was partitioned into several sublayers, each of which encapsulates largely independent functionality. The Physical Coding Sublayer (PCS) is responsible for frame delineation, frame formatting, and line coding. Key characteristics of the PCS for high-speed transmission are that it should 1) offer a low-overhead, robust frame delineation; 2) utilize a low-overhead data encoding that does not unnecessarily burden front-end receiver circuitry; 3) be amenable to implementation in commodity silicon technology; and 4) take into account system-level implementation and integration issues such as electromagnetic interference mitigation.

In the so-called Gigabit Ethernet Standard (IEEE 802.3z), an 8 b/10b block code is used for both line coding and frame delineation. The 8b/10b coding scheme offers several desirable properties, namely a large code space having many unused codes (so that errors are reliably detected), good transition density, run-length limiting and DC-balancing. These advantages are offset by the 25% overhead. For example, for serial transmission at a bit rate of 10 Gbits/s, the 25% overhead of 8 b/10 b coding requires optical and electrical components that operate at 12.5 GHz. Currently, components with this capability are neither low cost nor manufacturable in high volume and yield. Further, the deterministic nature of the block code gives rise to serious electromagnetic interference (EMI) generation when the input symbol stream is constant or highly repetitive, as is the case when the link is idle and long sequences of IDLE characters are transmitted.

An improved point-to-point data link protocol is described by Doshi et al. in an article entitled "A Simple Data Link Protocol for High-Speed Packet Networks," published in the Bell Labs Technical Journal January–March 1999 on pages 85–104 and incorporated herein by reference in its entirety. The described simple data link (SDL) protocol provides for the framing of asynchronous protocol data units (PDUs) using a length indicator and pointer scheme whereby a pointer in the header of one packet or data frame is used to identify the start of a next packet or data frame. The SDL utilizes a length indicator field and a header cyclic redundancy check (CRC) to delineate frames. Unfortunately, in the case where packet length information is not available, an entire packet must be stored, thereby increasing latency. This may not be acceptable in some applications, such as "cut-through" packet switching.

SUMMARY OF THE INVENTION

The present invention provides a data structure, method, apparatus and protocol that utilizes the so-called inter-packet gap (IPG) to store a relatively long termination flag (T-FLAG) and a relatively short sequence identification nonce. The termination flag is used to indicate the beginning of a control portion of a data stream, where the data stream is divided into alternating control and data portions, each of the data portions comprising a packet or frame. Thus, the termination flag also indicates the end of a data frame. The sequence identification nonce comprises a single-use token computed according to a unique function based upon a data payload temporally adjacent the termination flag (e.g., a cyclical redundancy check (CRC), count of words or double words, etc. based upon a temporally preceding data packet or frame). It will be appreciated by those skilled in the art that the invention has wide applicability to any communications system where packet or frame delineation is desirable.

One embodiment of the invention achieves zero-overhead frame delineation by embedding a long (e.g., 80-bit) termination flag (T-FLAG) and, optionally, a short (e.g., 16-bit) sequence identification nonce (i.e., a single-use token) in the IPG. Any unique function of the data payload could be used to compute the nonce, such as a CRC-16 or data payload length parameter. The length of the payload may be expressed, for example, as the number of double-words between a start-of-frame-delineation (SFD) and an end-of-frame-delineation (EFD) character. When a receiver finds a T-FLAG in the incoming stream, the next two bytes must match the count since the last SFD, otherwise the frame is dropped.

Since the IPG is already required, the frame delineation scheme adds no additional overhead. It will be shown that such a scheme is robust in the presence of both burst and random errors.

BRIEF DESCRIPTION OF THE DRAWINGS

The teachings of the present invention can be readily understood by considering the following detailed description in conjunction with the accompanying drawing, in which:

FIG. 8 depicts a high level block diagram of a system according to the present invention.

To facilitate understanding, identical reference numerals have been used, where possible, to designate identical elements that are common to the figures.

DETAILED DESCRIPTION OF THE PREFERRED EMBODIMENT

The present invention will be described within the context of a protocol suitable for delineating packets or frames within point-to-point communications links, where the need for a collision resolution mechanism does not exist, but where the legacy feature from collision-based versions of Ethernet known as the inter-packet gap (IPG) is still used. The inter-packet gap comprises a pause between back-to-back transmissions. During this pause, other stations may contend for access to the media, and coupled with a contention back-off and retransmission scheme, this prevents a single user from monopolizing the link. In full-duplex, point-to-point links, the need for a collision resolution mechanism is removed. However, the IPG still proves useful in the context of compensating for clock frequency offset between transmitter and receiver Media Access Control (MAC) entities. A (minimum) 12-byte IPG is typically transmitted between successive packets.

Figure 1:
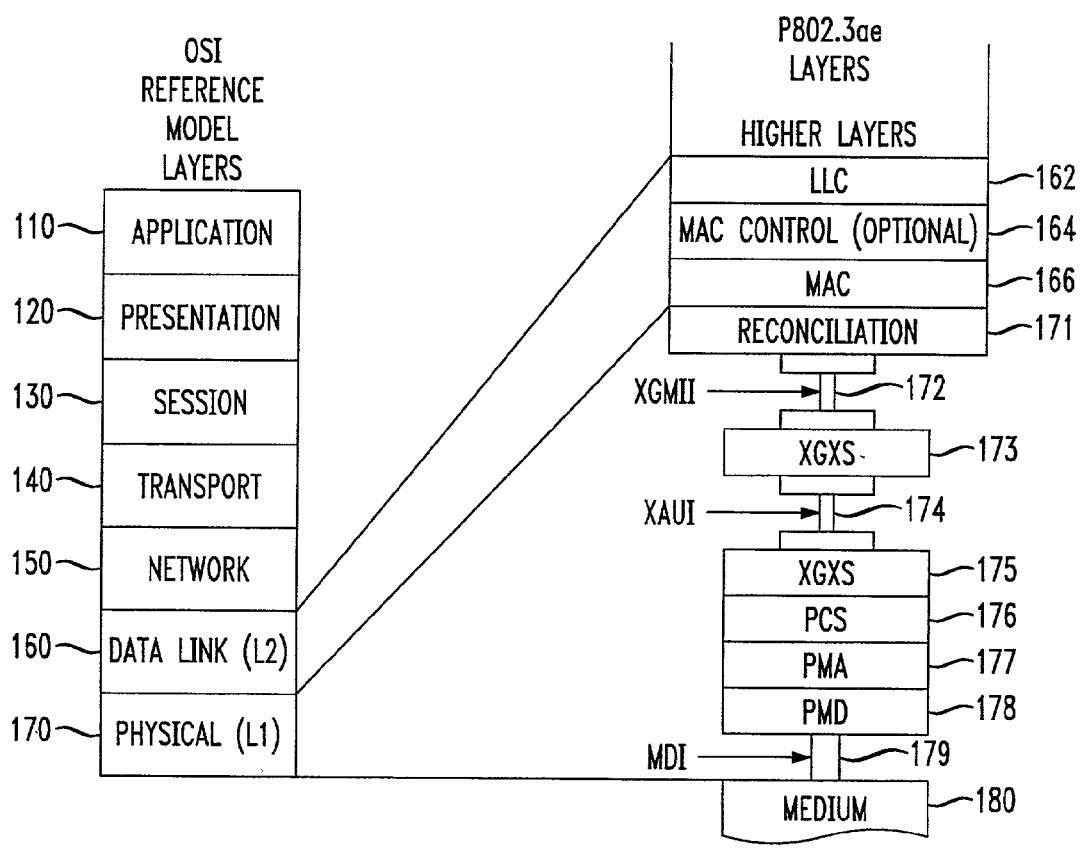
FIG. 1 depicts a high level block diagram of an open systems interconnection (OSI) and Ethernet protocol stack benefiting from the present invention.

FIG. 1 depicts a high level block diagram of an open systems interconnection (OSI) and Ethernet protocol stack 100 benefiting from the present invention. Specifically, the protocol stack 100 comprises an application layer 110 a presentation layer 120, a session layer 130, a transport layer 140, a network layer 150, a data link layer 160 (i.e., an $L_2$ link layer) and a physical layer 170 (i.e., an $L_1$ link layer). The protocol stack 100 logically rests upon the physical medium 180. It is noted that the protocol stack layers are hierarchically described from upper logical layers to lower logical layers, where the lowest logical layer comprises the physical layer.

The network layer 150 and higher layers conform to, illustratively, one of the various Ethernet standards. It will be appreciated by those skilled in the arts that other communication standards, techniques and methodologies utilizing an inter-packet gap or, more broadly, an available portion of time between successive data frames or packets may also benefit from the present invention.

The data link layer 160 comprises a logical link control (LLC) 162, an optional media access control (MAC) layer 164 and a MAC layer 166. The physical layer 170 comprises a reconciliation layer 171, a media independent interface layer 172 (illustratively an XGMII 10 gigabit media independent interface), an XGMII extender sublayer (XGXS) 173, an attachment unit interface 174 (illustratively a 10 gigabit attachment unit interface XAUI) a second XGMII extender sublayer 175, a physical coding sublayer 176, a physical media attachment 177, a physical media dependent layer 178 and a media dependent interface (MDI) layer 179.

One embodiment of the invention operates within the physical coding sublayer (PCS) 175. The physical coding sublayer is responsible for frame delineation, frame formatting and line coding. The inventor protocol provides a mechanism for delineating frames or data payloads, formatting inter-frame control space according to a synchronization pattern and, optionally, one or more data patterns associated with a preceding data region.

The present invention is directed to simplifying the task of frame delineation. Frame delineation is a task of finding transition points between a data frame and a subsequent control frame, and between a control frame and a subsequent data frame. A transmitting PCS may associate each byte in an incoming data stream with either a data frame payload (datagram) or a "control frame" identifier. A start of frame delimiter (SFD), end of frame delimiter (EFD) and idle character are examples of the various control characters employed for this task.

Figure 2:
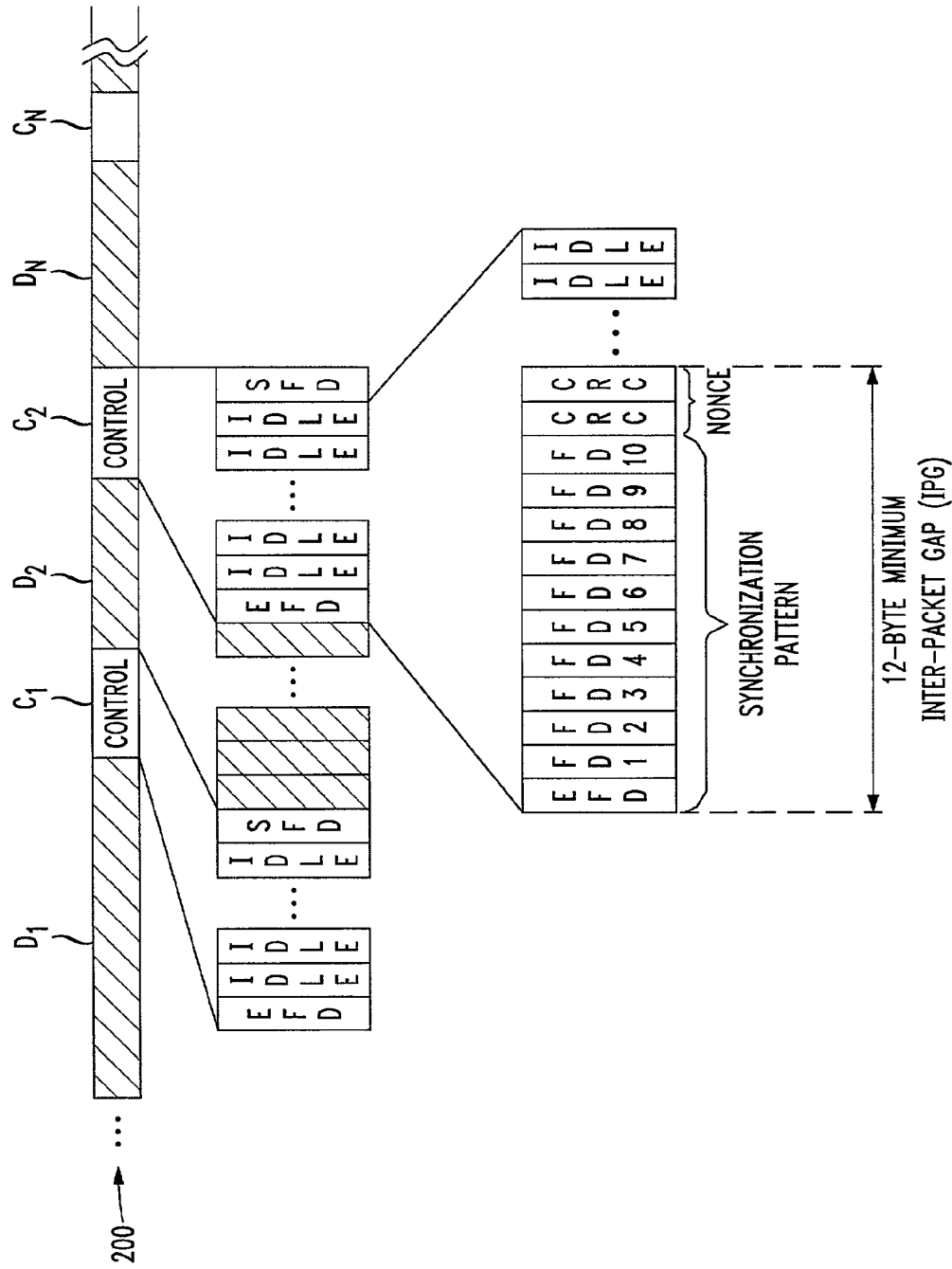
FIGS. 2 and 3 depict block diagrams of data structures according to embodiments of the present invention.

FIG. 2 depicts a data structure according to the present invention. Specifically, FIG. 2 depicts a packetized data stream 200 comprising alternating data (D) and control (C) portions denoted as $D_1$, $C_1$, $D_2$, $C_2$, and so on up to $D_N$, $C_N$. The data portion D of the packetized data stream may comprise any form of data. Since the present invention is most applicable to packetized data streams composed of variable length data packets, it will be assumed that each data portion D of the packetized data stream 200 comprises a payload portion of a variable length packet.

First control portion $C_1$ comprises a plurality of control related data bytes. Specifically, an end-of-frame (EFD) delineation character is followed by a plurality of idle (IDLE) characters and a start-of-frame (SFD) delineation character. The EFD control character in the first control portion $C_1$ defines the end of first data portion $D_1$, while the SFD control character defines the initial portion of second data portion $D_2$.

Second control portion $C_2$ comprises an EFD character followed by a plurality of idle characters and an SFD character. As previously discussed, the inter-packet gap (IPG) feature that has been carried forward from the earlier versions of the Ethernet comprises a minimum 12 byte gap between the end of one data packet and the start of another data packet. That is, the IPG provides for at least 12 idle characters between the EFD and the SFD of a control portion.

The invention utilizes the IPG by embedding a long (e.g., 80-bit) termination flag (T-FLAG) within the IPG to operate as a synchronization pattern which will identify a control portion of the packetized data stream 200. As noted in FIG. 2, the 10 idle characters immediately following the EFD character in control portion $C_2$ are replaced by ten flag data characters denoted as $FD_1$ through $FD_{10}$. In this manner, an 80-bit synchronization pattern is established. It is noted that the synchronization pattern may comprise more or less bytes, though it is important to insure that the number of bytes used for the synchronization pattern does not exceed the IPG implemented in a system processing the packetized data stream 200. As the number of bytes allocable to the synchronization pattern increases, the possibility of such a synchronization pattern occurring within a data portion D is greatly reduced.

In one embodiment of the invention, a sequence identification nonce (i.e., a single-use token) is also included within the IPG. The nonce is computed as a unique function based upon the data payload. In FIG. 2, the nonce comprises a 16-bit cyclical redundancy check (CRC-16). In one embodiment of the invention, the nonce comprises an expression related to the length of the preceding data portion or data payload. This length may be expressed as a number of words or double-words between the SFD and EFD characters. In this manner, a receiver identifying a T-FLAG in an incoming stream may also match the number of single (or double) bytes in the immediately received data payload to the count stored as a nonce. In the event of a mismatch, the data packet is dropped.

The data stored within the data portions D is preferably scrambled or otherwise encoded in a manner providing DC-balance and probabilistic transition density such that the chance of a T-FLAG appearing in the payload is greatly reduced. The inventors have found that a 10-byte T-FLAG reduces this chance to once every approximately 3.8 million years in the case of a 10 gigabit per second stream. Various scrambling techniques such as those used in synchronous optical network (SONET) and other schemes may be employed for this purpose.

Figure 3:
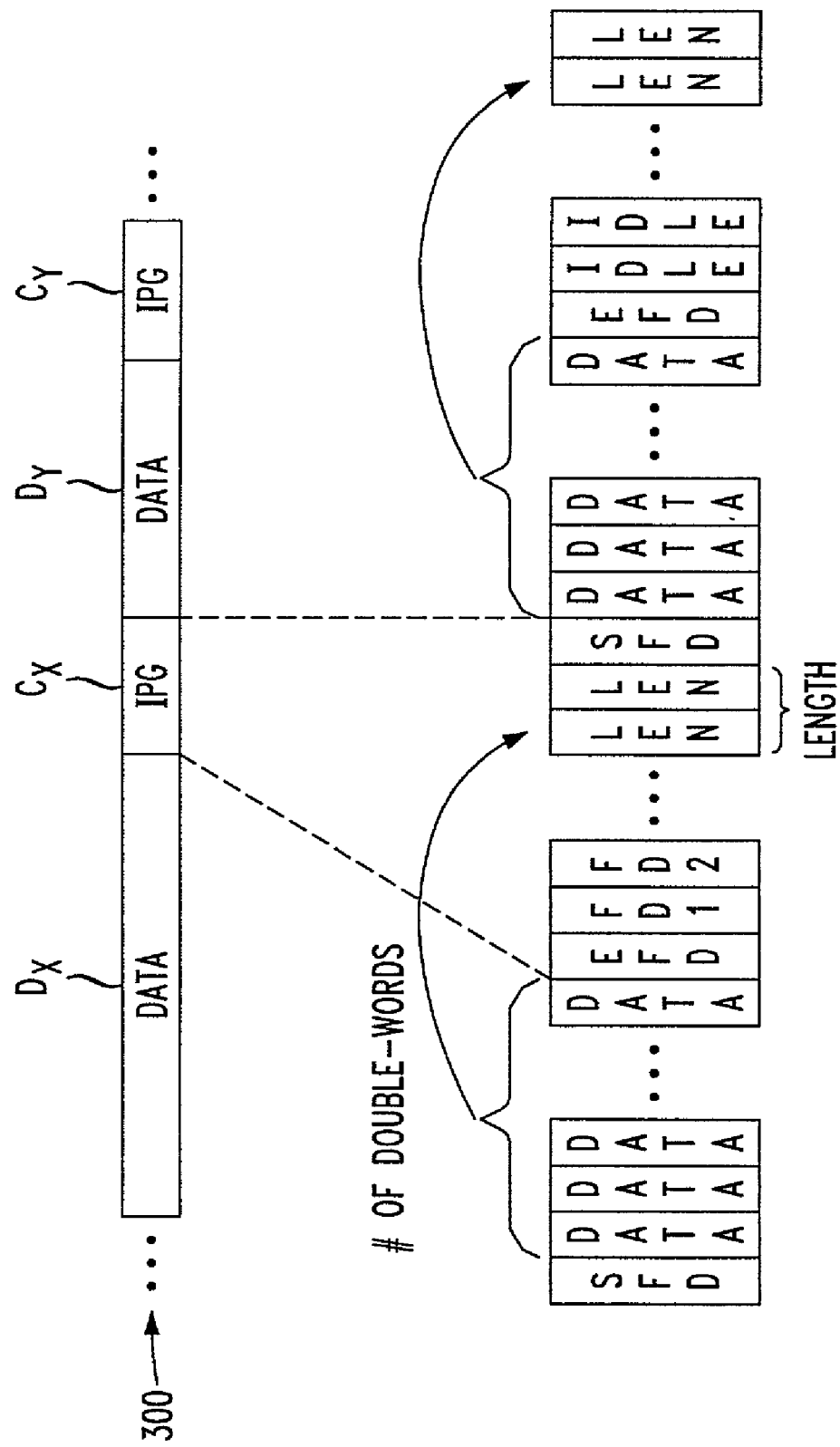

FIG. 3 depicts a block diagram of a data structure according to an embodiment of the present invention. Specifically, FIG. 3 depicts the packetized data stream 300 comprising a first data portion $D_X$, a first control portion $C_X$, a second data portion $D_Y$, and a second control portion $C_Y$. It is noted that the packetized data stream 300 continues with alternating data and control portions (not shown). FIG. 3 illustrates the use of a length field (LEN) indicative of the number of double words in a preceding data portion. That is, the number of double words within the data frame $D_X$ is calculated and stored within a two byte length field within the IPG. The two byte length field preferably follows the multiple byte T-FLAG fields within the IPG. The length field LEN may be inserted prior to or following a CRC field, such as shown in FIG. 2. It will be appreciated by those skilled in the art that only the T-FLAG field within the IPG is required. The length field and/or CR field are optional fields useful in providing additional information to a receiver such that errors may be avoided.

Figure 4:
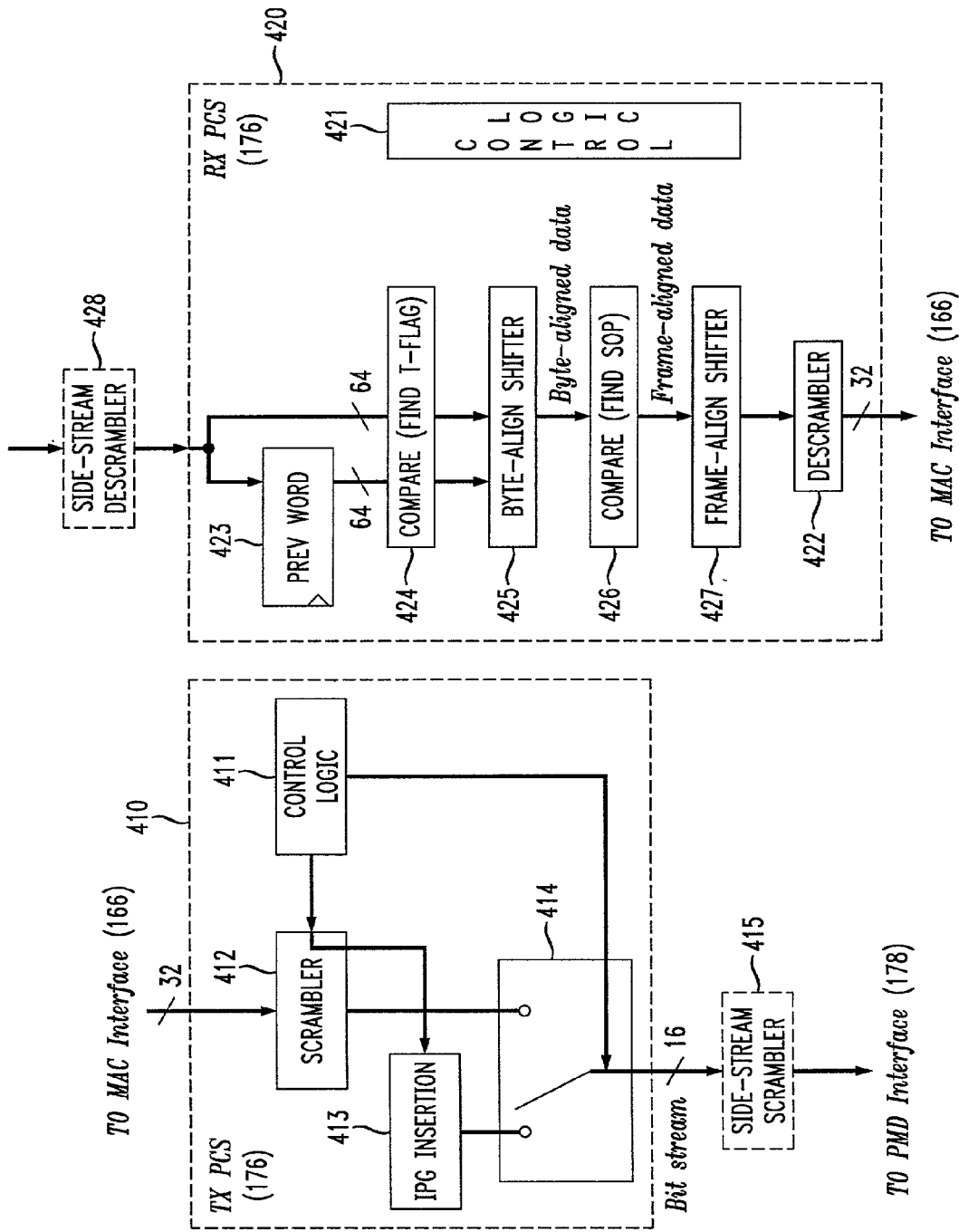
FIG. 4 depicts a high level functional block diagram of a physical coding sublayer suitable for use in the protocol stack of FIG. 1.

FIG. 4 depicts a high level functional (i.e., hardware, software or a combination of hardware and software) block diagram of a physical coding sublayer (PCS) suitable for use in the protocol stack of FIG. 1. Specifically, FIG. 4 depicts a functional implementation of a transmitter PCS 410 and a receiver PCS 420 according to an embodiment of the invention. The transmitter PCS 410 and receiver PCS 420 are logically situated within a protocol stack in a manner similar to the PCS 176 described above with respect to FIG. 1.

Transmitter PCS 410 receives an input data stream from a MAC interface, processes the received data stream and provides a processed data stream to a PMD interface. Receiver PCS 420 receives the process data stream from the PMD interface, processes the received data stream to extract the input data initially provided to the transmitter PCS 410, and provides the extracted data to a MAC interface.

PCS 410 comprises a control logic block 411, a scrambler logic block 412 and an IPG insertion block 413, a switching block 414 and, optionally, a side-stream scrambler block 415.

Data frames or packets received from the MAC interface are provided to the scrambler block 412 for scrambling. In a preferred embodiment of the invention, the scrambler logic block 412 utilizes a self-synchronizing scrambler using a polynomial such as $X^{43}+1$ which is relatively prime with the CRC-32 generator polynomial used to provide a CRC-32 data token, thus preserving the error detection capability of the data frame CRC. In one embodiment of the invention, to reduce electromagnetic interference (EMI), a second scrambler (i.e., a "side-stream" scrambler) is applied to both the scrambled pay load and control characters. The optional side-stream scrambler is depicted as element 415 in FIG. 4.

The scrambled data frame or packet provided by the scrambler block 412 is logically coupled to a first input of switching block 414. Control logic 411 communicates with the scrambler block 412 and the IPG insertion block 413 to cause a T-FLAG and, optionally, a CRC, length indicative data element or other element to be generated based upon the received data frame or packet. The output of IPG insertion block 413 is coupled to a second logical element of switch 414.

Control logic 411 causes logical switch 414 to alternatively provide at a logical output a scrambled data frame or packet from scrambler block 412 and IPG insertion data from IPG insertion block 413. That is, control logic 411 causes the formation at the output of logical switch 414 of a packetized data stream comprising alternating data portions and control portions, such as discussed above with respect to FIGS. 2 and 3. If the transmit queue is empty, the control logic 411 causes the insertion of IDLE characters into an output stream provided to the PMD interface. When new data is to be transmitted, a start of frame delineator (SFD) is transmitted followed by the new data frame. When the end of the data frame payload is reached, the scrambler is frozen and an end-of-frame delineator (EFD) is inserted into the output stream, followed by the T-FLAG and nonce. The controller monitors the output of scrambler 412 and, if a T-FLAG is generated, the current transmission is immediately terminated with an error flag (E-FLAG), signaling the receiver to abort reception of the data stream. Higher layer protocols may then be used to retransmit the packet or data frame having such an error. In this manner, since the scrambler will be in a different state upon retransmission, the odds of the scrambler again generating a T-FLAG are negligible.

The packetized data stream so formed is coupled to a physical media dependent interface for subsequent transmission via a medium to a receiver. Optionally, a side-stream scrambler 415 is used to further scramble the packetized bit stream. In a preferred embodiment of the invention, the side-stream scrambler 415 utilizes a self-synchronizing scrambler using a polynomial such as $X^7+X^6+1$. The side-stream scrambler helps reduce EMI.

Scrambling is used to encode the data and provide DC-balance and probabilistic transition density, and to reduce the chance that a T-FLAG appears in the payload (at 10 Gb/s, once every ~3.8 million years). Scrambling schemes are widely used in SONET/OTN systems.

The operation of the transmitter is summarized as follows: when a transmit output queue is empty, the transmitter inserts IDLE characters into the output stream provided to the PMD interface. When new data to be transmitted is received via the MAC interface, the transmitter outputs a start of frame delineator (SFD) to the PMD interface. The data received via the MAC interface is then scrambled and output to the PMD interface as a new data frame. When the end of the payload comprising the data frame is reached, the scrambler is frozen and the transmitter outputs an end of frame delineator (EFD) to the PMD interface, followed by a T-FLAG and, optionally, one or more nonces. The transmitter also monitors the output of the scrambler, and if a T-FLAG is generated by the scrambler (which will result in a frame delineation error at a receiver), the current transmission is immediately terminated and an error flag (E-FLAG) is transmitted, thereby signaling a receiver to abort reception of the data frame. At this point, higher level protocols will likely retransmit the packet. Since the scrambler will be in a different state upon retransmission, the odds of generating another T-FLAG are negligible. Further, the odds of generating such a T-FLAG may be reduced by increasing the number of bytes allocated to a T-FLAG.

Advantageously, the invention provides a zero-overhead frame delineation and line coding protocol suitable for use in high-speed optical transmission systems has been presented, and has been shown to provide performance comparable to legacy protocols. The protocol is robust in the presence of both random and burst errors, and is easily implemented in either VLSI or FPGA-based systems.

The receiver physical coding sublayer comprises control logic 421, a descrambler 422, a previous word storage buffer 423, a T-FLAG comparator function 424, a byte-alignment shifter 425, a start of packet comparator function 426 and a frame-alignment shifter 427. Optionally, a side-stream descrambler 428 is provided.

The PCS 420 receives the packetized data stream provided by the PCS 410. If the PCS 410 utilized a side-stream scrambler 415, then the receiver PCS 420 utilizes a complementary side-stream descrambler 428 to recreate the initial packetized data stream prior to the side-stream scrambling function. The control logic 421 operates to cause the various functional elements of the PCS 420 to operate as follows. The previous word buffer 423 stores a previously received data word. The T-FLAG comparator function 424 compares the previously stored word from the previous word buffer 423 to a presently received word from the PMD interface. When a T-FLAG is found, the previous word and presently received word are provided to the byte alignment shifter 425 which stores a plurality of such provided words in a byte-aligned manner (i.e., aligned with respect to packet or frame boundaries delineated by a T-FLAG). Byte aligned data is provided to the start of packet comparator function 426 which responsively produces frame-aligned data. The frame-aligned data is provided to the frame-alignment shifter 427 which responsively produces at least the initially scrambled data frame or packet. This data frame or packet is then descrambled by the descrambler 422 and applied to the MAC interface of the receiver.

Figure 5:
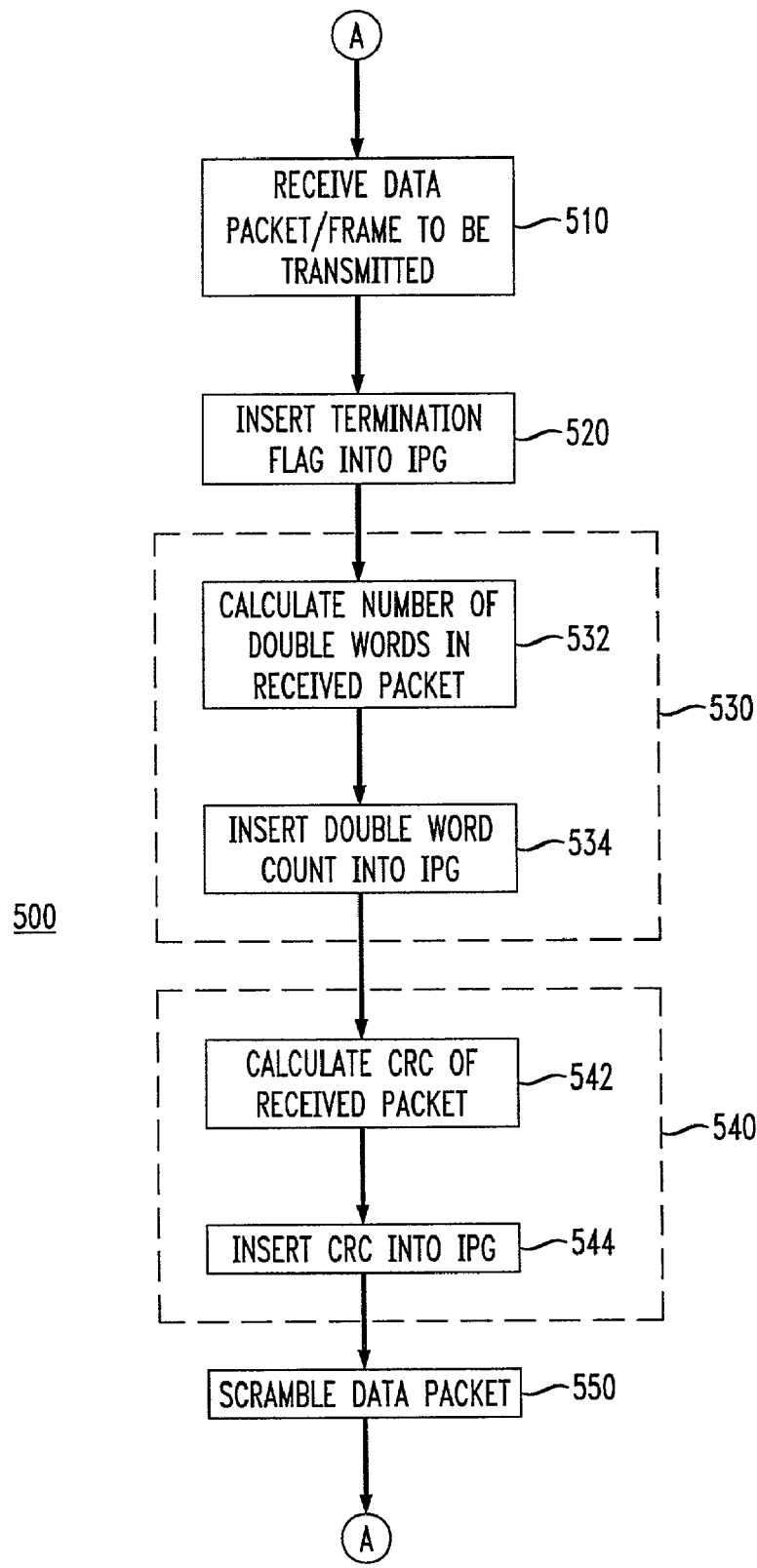
FIG. 5 depicts a flow diagram of a packet processing method suitable for use in a transmitter according to the invention.

FIG. 5 depicts a flow diagram of a packet processing method suitable for use in a transmitter according to the invention. The method 500 of FIG. 5 is entered at step 510 when a data packet to be transmitted is received.

At step 520, termination flag data is inserted within the respective IPG. That is, at step 520A, a 9 to 12 byte (preferably) termination flag (T-FLAG) or synchronization pattern is appended to the data packet in a manner temporally occupying at least a portion of the 12 byte minimum inter-packet gap (IPG) previously discussed. The T-FLAG comprises a unique bit pattern that will be detected by a receiver such that packet delineation may be determined.

At optional step 530, a first type of nonce is generated and utilized. Specifically, at step 532, the number of double words in the received packet is calculated and, at step 534, the double word count is inserted within the respective IPG.

At optional step 540, a second type of nonce is generated and utilized. Specifically, at step 542, a cyclical redundancy check (CRC) of the received packet is calculated and, at step 544, the CRC is inserted within the respective IPG.

At step 550, the data packet is scrambled. That is, at step 550, the data packet received is scrambled while the control information comprising the termination flag and, optionally, one or more nonces is not scrambled.

The method 500 is then repeated for the next data packet. The above-described method 500 is suitable for use in the transmitter PCS 410 described above with respect to FIG. 4. It will be appreciated that the method 500 of FIG. 5 may be modified to effect various embodiments of the invention. For example, it is noted that the step 550 of scrambling data packet is shown as following the various T-FLAG and nonce calculation steps. However, as described above with respect to FIG. 4, a received data packet or frame may be scrambled prior to the generation of termination flags and/or calculation of nonces. In the case of scrambling a received data frame or packet prior to nonce generation, it is preferable to use nonce functions that are compatible with the scrambling techniques (e.g., using scrambling polynomials that are compatible with nonces generated at CRCs).

Figure 6:
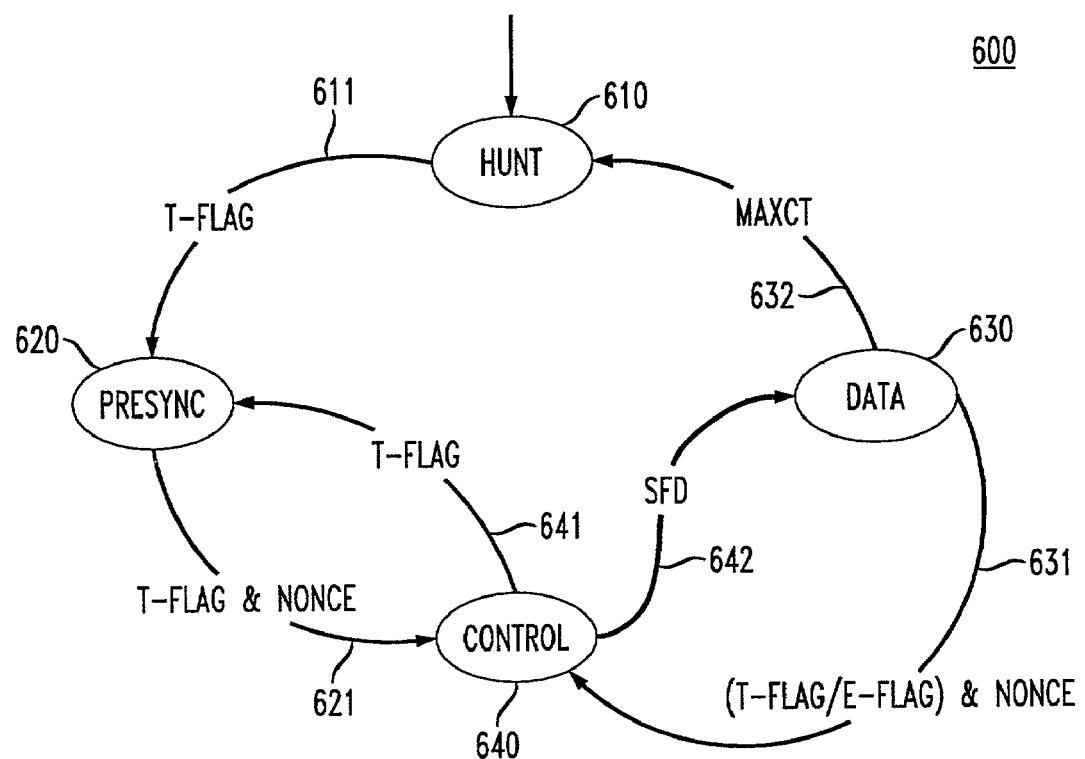
FIG. 6 depicts a state diagram of the operation of a receiver according to the present invention.

FIG. 6 depicts a state diagram of the operation of a receiver according to the present invention. The operation of FIG. 6 describes various states utilized in an embodiment of the PCS 420 described above with respect to FIG. 4.

The state machine 600 of FIG. 6 initially begins in a HUNT state 610. When a T-FLAG is detected 611 in an input data stream, the receiver enters 611 a PRESYNC state 620 where a nonce data structure is used. Otherwise, the receiver enters a CONTROL state 641. In the PRESYNC state 620, a nonce counter is reset if the above-described data indicative nonce is used. If such a nonce is not used, the receiver immediately proceeds 621 to a CONTROL state 640. Upon receiving a T-FLAG and (if used) a valid nonce, the receiver proceeds 621 to the CONTROL state 640, where it remains until a start of frame delineator (SFD) is found, at which point the receiver proceeds 642 to a DATA state 630. The receiver remains in the DATA state 630 until either a valid termination is found, or until, for example, twice the maximum byte count of one Ethernet packet (2×1,518 bytes) is exceeded. Upon receipt of a valid termination, the receiver proceeds 631 to the control state 640. Upon detecting a byte count exceeding a maximum byte count, the receiver proceeds 632 to the HUNT state.

In the absence of burst errors, detecting the T-FLAG only (without the additional 2-byte length field) is sufficient to reliably accomplish frame delineation. However, in the presence of burst errors, it is possible that an erroneous T-FLAG appears at the receiver (early termination), or that an actual T-FLAG is corrupted and thus missed by the receiver (missed termination). Both cases lead to a condition of acceptance of false packet, which is the result of accepting a frame that has been terminated at the wrong point, and can be catastrophic in certain applications where error detection capabilities of higher layer protocols are limited to enhance. Since the error detection capabilities of the frame check sequence (FCS) is only applicable when the checksum is computed over the original packet, the checksum process for an incorrectly terminated frame becomes a game of chance that the CRC-32 of the shortened (or concatenated) frame does not match a random 32-bit number (the original FCS). Thus, conditioned on knowing that a termination error has occurred, the probability of falsely accepting the packet at the MAC layer is $2^{-32}*BER$, where BER is the bit error rate of Ethernet sequence and a typical value of BER for backbone network is $10^{-12}$. The resulting mean time to false packet acceptance rate is not acceptable. Introduction of the additional 2-byte length field after the T-FLAG solves this problem, as shown in the rest of the section.

In one embodiment, a packet is accepted only when (1) an exact match of the start of packet (SOP) byte followed by payload (2) and by an exact match of the 10-byte T-FLAG and (3) the 2-byte length field is found. Either an early or later false match of T-FLAG and length field leads to false acceptance.

False packets could result from a false match of the 10-byte T-FLAG and 2-byte length field inside of the payload. Since the transmitter never allows a T-FLAG to occur in the middle of the data frame, erroneous detection of T-FLAGs in the payload occurs with a probability of $$p1=(\tfrac{1}{2})^{96}*[1-(1-BER)^{80}]\approx 1.01*10^{-27}*BER.$$

This is further protected by the 32-bit CRC and results in a probability below $10^{-40}$ and is negligible. Another case of false packet caused by false match on T-FLAG and length field is when the receiver fails to detect the right termination, and find a false matching sequence either in the following control block or payload block, etc. Without the additional 2-byte length field, probability of acceptance of concatenated false packets is in the order of BER and is unacceptably high. The additional length field adds protection against accepting concatenated packets, and reduces the false packet rate to $$p2 = [1 - (1 - BER)^{96}]$$
$$* \{(1/2)^{96} * [1 - (1 - BER)^{80}] + (1 - BER)^{80} * [1 - (1 - BER)^{16}] + \ldots\}$$
$$\approx 0.023 * BER^2$$

With additional CRC protection, this occurs with a probability proportional to $2^{-32}BER^2$, which corresponds to having one error event every billion of billion years. This result holds true for both random and burst errors, and is comparable to that of 8B/10B.

Probability of packet loss, and synchronization loss rate and re-synchronization delay are important factors that affect the performance of packet delineation schemes. The inventors have conducted experiments to compare these parameters using SLP and 8B/10B systems. The experimental results are summarized in Table 1, which shows the delineation performance of SLP and 8B/10B. The experiment was based on a BER of $10^{-12}$ and a 500-byte average packet length.

TABLE 1

| Performance | SLP | 8B/10B |
| --- | --- | --- |
| Prob. Packet Loss | 96 * $10^{-11}$ | 2 * $10^{-11}$ |
| Mean Time to PL | 1.16 hours | 4.5 hours |
| Re-sync delay | 2 packet | 0 packet |

In one embodiment, a pointer is inserted within the IPG to indicate, for example, the start position of the next data frame. In this embodiment of the invention, use of a pointer further increases the ability of a receiver to recover from a situation whereby a T-FLAG is not detected, such recovery of a pointer indicative of a data frame length much shorter than the actual data frame length retrieved indicates a likely occurrence of a "mist" detection of a T-FLAG.

In one embodiment, a receiver detecting a T-FLAG utilizes a statistical correlation to determine whether a T-FLAG has likely been received. Specifically, an n-bit difference tolerance is established wherein a group of bytes received that differ from the expected T-FLAG by only n-bits are considered to comprise a received T-FLAG. Depending upon the size of the T-FLAG, n may be increased or decreased. That is, given a T-FLAG of 12 bytes, n may comprise, illustratively, 8 (1 byte). By contrast, given a T-FLAG size of only 9 bytes, n will be much smaller, illustratively 2 bits. In this embodiment of the invention, it is also advantageous to utilize the previously discussed length, CRC and other nonces.

In one embodiment, control characters are hamming encoded to provide additional error detection and correction capability.

In one embodiment, an encoded output stream, such as produced by the PCS 410 of FIG. 4, is further processed according to wave division multiplexing (WDM) techniques. For example, an encoded output stream comprising a sequence of encoded bytes is demultiplexed to produce, illustratively, four serial data streams. That is, every first, second, third and fourth byte in the encoded stream is coupled to a respective first, second, third and fourth lane within the context of a WDM system. The respective four data streams are converted into optical data streams having respective wavelengths and then multiplexed to produce a WDM output stream suitable for transport via an optical network such as a SONET network. At a receiver, the WDM data stream is demultiplexed to recover the data streams within the four lanes, which streams are in turn combined to recreate the encoded data stream. In this manner, WDM techniques may be applied to the present invention.

Within the context of the WDM embodiment, it is noted that skew of the various WDM lanes may occur. This skew is compensated for by, for example, using the preamble or special control characters during idle modes. Additionally, by constraining the resulting WDM stream such that the first lane always includes a start of frame delineator (SFD), rotational ambiguity may be addressed and stream recreation may be simplified. The WDM stream may be further constrained by utilizing special control characters to indicate appropriate lane resequencing.

Figure 7:
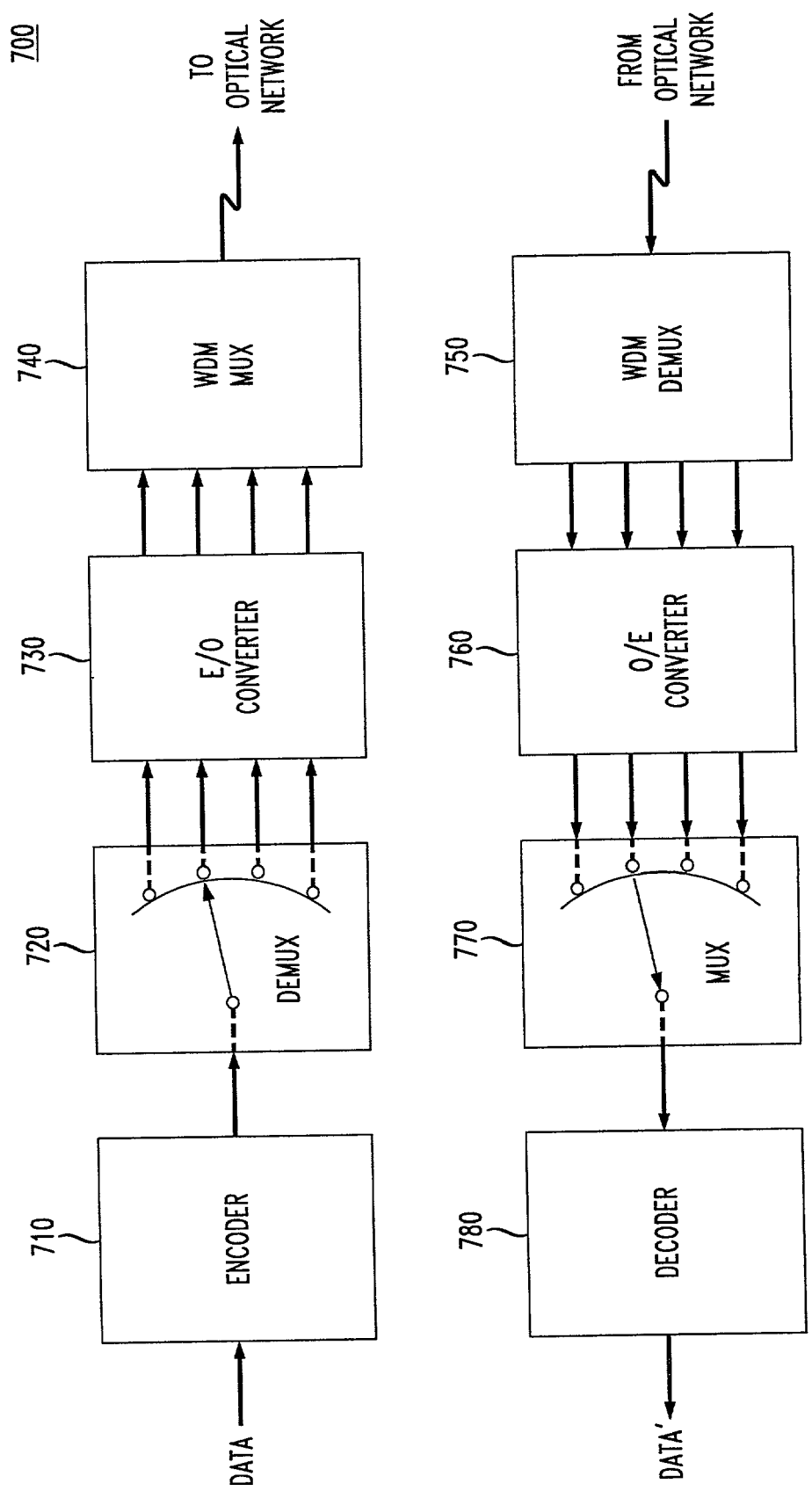
FIG. 7 depicts a high level block diagram of a system according to the invention.

FIG. 7 depicts a high level block diagram of a system according to the invention. Specifically, FIG. 7 depicts a high level block diagram of a wave division multiplex (WDM) communication system utilizing the teachings of the present invention. The WDM system 700 of FIG. 7 comprises transmitter apparatus and receiver apparatus. The transmitter apparatus comprises an encoder 710 that receives a data stream DATA and encodes the received data stream DATA in the manner described above with respect to the PCS 410 (and, optionally, the side-stream scrambler 415) of FIG. 4. The resulting encoded data stream is coupled to a demultiplexer 720. The demultiplexer 720 demultiplexes the encoded data stream on a byte-by-byte basis to produce, illustratively, four data streams or "lanes." It will be appreciated by those skilled in the art that while four lanes are shown in FIG. 7 and described herein, any number of lanes may be utilized.

The data streams produced by the demultiplexer 710 are then converted to respective optical signals having respective optical wavelengths by electrical-to-optical (E/O) converter 730. The optical signals are then multiplexed by a wave division multiplexer 740 to produce a multiplexed output stream, which may be coupled to an optical network (not shown).

Receiver apparatus within the system 700 of FIG. 7 comprises a WDM demultiplexer 750, which is coupled to an optical network (not shown) to receive a WDM multiplexed data stream, such as produced by the encoder 710. The WDM demultiplexer 750 produces N (illustratively 4) output streams, which are coupled to an optical to electrical (O/E) converter 760. A corresponding N (illustratively 4) electrical output streams are coupled from the O/E converter 760 to a multiplexer 770, which converts the multiple streams into a single encoded data stream. The single encoded data stream is then decoded by a decoder 780 according to the above-described decoder and/or receiver techniques according to the present invention. The decoder 780 produces an output data stream DATA'.

FIG. 8 depicts a high level block diagram of a system according to the present invention. Specifically, FIG. 8 depicts a high level block diagram of a system 800 including an encoder for encoding a received data stream DATA and transmitting one or more encoded streams to a decoder 830 via a medium 820. The decoder responsively produces a decoded output stream OUT.

The data encoder 810 includes a plurality of encoding sub-elements (sub-elements $E_0$ through $E_N$) denoted as $815_0$ through $815_N$. The encoder 810 processes a data stream DATA according to the encoding principles of the present invention. The encoders 810 of FIG. 8 operate in a parallel manner wherein each of the N sub-encoders is used to process a respective portion of the received data stream DATA (e.g., a respective byte). In this manner, a high speed data stream may be processed using a plurality of lower speed processing elements, thus reducing the cost of each processing element. Each of the encoding sub-elements 815 produces a respective output stream that is transmitted via a medium 820.

The decoder 830 comprises a plurality of sub-decoders ($D_0$ through $D_N$) denoted as sub-decoders $835_0$ through $835_N$. Each of the sub-decoders 835 operates on a respective portion of an encoded data stream, such as provided by the encoder sub-elements 815. The decoders $835_0$ through $835_N$ decode the respective stream portions according to the principles of the invention described above to produce an output stream OUT.

In one embodiment of the system 800 of FIG. 8, the encoder 810 and decoder 830 are physically situated within separate integrated circuits (ICs) on a printed circuit board (PCB) or on separate printed circuit boards. In this case, the medium 820 comprises an inter-circuit or inter-circuit board connection medium, such as an electrical conductor or optical data link. It will be appreciated by those skilled in the art that electrical and/or optical signal conditioning circuitry (not shown) is required to process the encoder output signals and decoder input signals.

In one embodiment of the system 800 of FIG. 8, the medium 820 comprises an optical network wherein the outputs of the respective encoders $815_0$ through $815_N$ are associated with respective wavelengths such as described above in FIG. 7. In this embodiment of the invention, a single physical connection is made between the encoder 810 and decoder 830, though N logical channels are employed.

While foregoing is directed to the exemplary embodiments of the present invention, other additional embodiments of the present invention may be devised without departing from the true scope thereof, wherein the true scope of the present invention may be determined by reference to the metes and bounds of the following claims.

The invention claimed is:

1. A method for frame delineation in a data communication system, comprising:
transmitting a plurality of data frames temporally separated by respective inter-packet gaps (IPGs), each IPG having positioned within it at least a synchronization pattern suitable for delineating a respective data frame and identifying a transition point between said respective data frame and a subsequent control portion.

2. The method of claim 1, wherein a length indicative data element is positioned within said IPG, each length indicative data element storing a length parameter associated with a data frame adjacent said IPG.

3. The method of claim 2, wherein said length indicative data element comprises a count of a number of double words within said adjacent data frame.

4. The method of claim 2, wherein said length indicative data element comprises a count of a number of words within said adjacent data frame.

5. The method of claim 1, wherein a cyclical redundancy check (CRC) data element is positioned within each IPG, said CRC data element storing a CRC generated using a data frame adjacent said IPG.

6. The method of claim 5, wherein said adjacent data frame is scrambled using a polynomial which is relatively prime with a CRC generator polynomial used to generate said respective CRC indicative data element.

7. The method of claim 1, wherein said data frame is scrambled using a polynomial.

8. The method of claim 7, wherein said scrambled data frame and the contents of said adjacent IPG are scrambled.

9. The method of claim 1, wherein a pointer data element is positioned within said IPG, said pointer data element indicating the position of a next data frame.

10. The method of claim 1, wherein each data frame is transmitted on a single channel.

11. The method of claim 1, wherein said data frames are encoded using an encoding scheme with substantially zero overhead.

12. A method for delineating data frames within a communications link, comprising:
receiving a data stream to be transmitted as a sequence of data frames; and
inserting, into a temporal region following each transmitted data frame, a synchronization pattern suitable for delineating said data frame and identifying a transition point between said respective data frame and a subsequent control portion.

13. The method of claim 12, further comprising:
inserting, into said temporal region following each transmitted data frame, a cyclical redundancy check (CRC) data element generated using the contents of said data frame.

14. The method of claim 13, further comprising:
inserting, into said temporal region following each transmitted data frame, a length indicative data element generated according to the contents of a respective data frame.

15. The method of claim 12, further comprising:
scrambling said received data included within said sequence of data frames; and
determining whether said scrambled data include a data pattern that is equivalent to said synchronization pattern; and
in the case of finding such a matching data pattern, inserting an error message into said data frame being formed.

16. The method of claim 15, wherein said scrambling is performed using a polynomial which is relatively prime with a CRC generator polynomial used to generate a CRC indicative data element, said CRC indicative data element being inserted into a temporal region following said data frame from which said CRC was generated.

17. The method of claim 12, further comprising the step of encoding said data stream using an encoding scheme with substantially zero overhead.

18. A method for transmitting data, comprising:
transmitting, to a physical media dependent (PMD) layer, a sequence of idle control characters;
transmitting, to said PMD layer, a start of frame delineator (SFD) upon detecting the presence of data to be transmitted;

transmitting said received data until an entire data frame has been transmitting; and transmitting, upon the transmission of said entire data frame, an end of frame delineator (EFD) and a termination flag (T-FLAG), said T-FLAG comprising a respective relatively long synchronization pattern suitable for delineating said data frame and identifying a transition point between said respective data frame and a subsequent control portion.

19. The method of claim 18, further comprising:
scrambling said data that forms said data frame.

20. The method of claim 19, further comprising:
scrambling said scrambled data, said SFD, said EFD and said T-FLAG.

21. The method of claim 18, further comprising:
transmitting, to said PMD layer, an error flag (E-FLAG) upon detecting an arrangement of data within said data frame substantially equivalent to said T-FLAG synchronization pattern.

22. The method of claim 18, further comprising the step of:
transmitting, upon the transmission of said entire data frame, a pointer indicative of the position of a next data frame to be transmitted.

23. A method for receiving data, comprising:
determining data frame delineation points within a received data stream by detecting the presence of a synchronization pattern within said data stream, said synchronization pattern being positioned within inter-packet gaps (IPGs) and identifying a transition point between a respective data frame and a subsequent control portion; and forming data frames for subsequent processing by utilizing said determined delineation points.

24. The method of claim 23, wherein said detection of said synchronization pattern comprises a correlation of data within said data stream to at least an n-bit difference between said synchronization pattern and said reference synchronization pattern.

25. The method of claim 24, further comprising:
discarding all data pertaining to a data frame being formed in response to the detection of an error flag within said input data stream.

26. The method of claim 23, further comprising:
identifying a cyclical redundancy check (CRC) data element proximate a termination flag (T-FLAG) and within a respective IPG; and utilizing said detected CRC and a CRC generated using a corresponding formed data frame to determine whether said formed data frame has been corrupted.

27. The method of claim 23, further comprising:
detecting a length indicative data element proximate said T-FLAG and within a respective IPG; and determining whether said received data frame has a length proximate the length indicated by said length detected length indicative data element.

28. The method of claim 23, further comprising:
detecting a pointer within said data stream proximate said T-FLAG, said pointer identifying a start position of a next data frame; and determining whether a gap within said data stream exists indicative of the corruption of a T-FLAG prior to the reception of said data stream.

29. The method of claim 23, wherein said data stream is received from a physical media dependent (PMD) layer and said formed data frames are provided to a media access control (MAC) interface layer.

* * * * *